US009723385B2

United States Patent
Hu et al.

(10) Patent No.: US 9,723,385 B2
(45) Date of Patent: Aug. 1, 2017

(54) PROCEDURES, APPARATUSES, SYSTEMS, AND COMPUTER PROGRAMS FOR PROVIDING OPTICAL NETWORK CHANNEL PROTECTION

(71) Applicant: Coriant Operations, Inc., Naperville, IL (US)

(72) Inventors: Peigang Hu, Shanghai (CN); Eric L. Chan, Naperville, IL (US); Matthew S. Vrba, St. Charles, IL (US)

(73) Assignee: Coriant Operations, LLC, Naperville, IL (US)

( * ) Notice: Subject to any disclaimer, the term of this patent is extended or adjusted under 35 U.S.C. 154(b) by 20 days.

(21) Appl. No.: 14/073,233

(22) Filed: Nov. 6, 2013

(65) Prior Publication Data
US 2015/0125141 A1    May 7, 2015

(51) Int. Cl.
| | |
|---|---|
| *H04J 14/00* | (2006.01) |
| *H04B 10/08* | (2006.01) |
| *H04Q 11/00* | (2006.01) |
| *H04B 10/032* | (2013.01) |
| *H04B 10/075* | (2013.01) |
| *H04J 14/02* | (2006.01) |
| *H04B 10/07* | (2013.01) |
| *H04B 10/079* | (2013.01) |

(52) U.S. Cl.
CPC ....... *H04Q 11/0005* (2013.01); *H04B 10/032* (2013.01); *H04B 10/075* (2013.01); *H04B 10/0793* (2013.01); *H04J 14/021* (2013.01); *H04J 14/0294* (2013.01); *H04J 14/0295* (2013.01); *H04B 10/07* (2013.01); *H04B 10/079* (2013.01)

(58) Field of Classification Search
None
See application file for complete search history.

(56) References Cited

U.S. PATENT DOCUMENTS

| | | | | |
|---|---|---|---|---|
| 6,081,359 | A  * | 6/2000 | Takehana | H04J 14/02 398/1 |
| 6,178,025 | B1 * | 1/2001 | Hardcastle | H04B 10/077 370/222 |
| 6,433,900 | B1 * | 8/2002 | Kuroyanagi | H04J 14/0297 398/19 |

(Continued)

OTHER PUBLICATIONS

Infinera, How to Maximize Network Bandwidth Efficiency, 2010, Infinera Corporation, p. 3.*

(Continued)

*Primary Examiner* — Ken N Vanderpuye
*Assistant Examiner* — Jai Lee
(74) *Attorney, Agent, or Firm* — Merchant & Gould, P.C.

(57) ABSTRACT

A procedure for transferring wavelengths, and a system that operates in accordance with the procedure. The system comprises at least one network terminal, each including a switch and a controller. A plurality of wavelength sets are applied to the switch. The controller is arranged to operate the switch such that the switch (a) selects at least one wavelength from at least one of the plurality of wavelength sets, based on electrical monitoring at a port module external to the network terminal, and (b) outputs the at least one wavelength to an output of the at least one network terminal.

29 Claims, 6 Drawing Sheets

(56) References Cited

U.S. PATENT DOCUMENTS

| | | | | |
|---|---|---|---|---|
| 6,915,075 B1* | 7/2005 | Oberg | | H04J 14/0279 398/45 |
| 7,072,584 B1* | 7/2006 | Lichtman | | H04J 14/0283 398/3 |
| 7,099,578 B1* | 8/2006 | Gerstel | | H04J 14/0295 370/216 |
| 7,308,197 B1 | 12/2007 | Zhong et al. | | 398/48 |
| 7,715,715 B2* | 5/2010 | Gerstel | | H04J 14/0227 398/48 |
| 8,412,038 B2* | 4/2013 | Natori | | H04J 14/0279 398/1 |
| 8,705,741 B2* | 4/2014 | Voruganti | | H04K 1/04 380/255 |
| 8,731,398 B2* | 5/2014 | Akiyama | | H04J 3/14 398/5 |
| 9,071,364 B1* | 6/2015 | Voois | | H04B 10/58 |
| 2001/0026384 A1* | 10/2001 | Sakano | | H04B 10/032 398/79 |
| 2003/0025956 A1 | 2/2003 | Li et al. | | 359/110 |
| 2003/0156840 A1* | 8/2003 | Uchikata | | H04J 14/0297 398/7 |
| 2003/0161629 A1* | 8/2003 | Frascolla | | H04Q 11/0062 398/5 |
| 2004/0161232 A1* | 8/2004 | Kerfoot, III | | H04J 14/029 398/5 |
| 2006/0133804 A1* | 6/2006 | Boduch | | H04J 14/0227 398/5 |
| 2007/0086332 A1* | 4/2007 | Way | | H04J 3/14 370/223 |
| 2010/0074386 A1* | 3/2010 | Sakamoto | | H04J 3/076 375/371 |
| 2012/0121250 A1* | 5/2012 | Xia | | H04B 10/0775 398/16 |
| 2013/0022352 A1* | 1/2013 | Yamashita | | H04J 14/0212 398/34 |
| 2013/0071104 A1* | 3/2013 | Nakashima | | H04J 14/0204 398/3 |
| 2014/0308047 A1* | 10/2014 | Mak et al. | | 398/182 |

OTHER PUBLICATIONS

Europe Telecom East & West Newsletter, Nov. 2010, Volumn 15, No. 11, p. 9.*
Hermans et al., Broadband Opto-Electrical Receivers in Standard CMOS, 2007, Springer, p. 13-14.*
Gupta, Textbook on Optical Fiber Communication and Its Applications, 2012, PHI Learning Private Limited, p. 340.*
Tricker, Ray, Optoelectronics and Fiber Optic Technology, 2002, Elsevier Science, p. 132-133.*
Smartoptics, Transponders and Muxponders: WDM networking solutions, Dec. 2015, p. 3.*
de Silva, Clarence W., Mechatronics: A Foundation Course, 2010, CRC Press, pp. 80-81.*

* cited by examiner

PROCEDURES, APPARATUSES, SYSTEMS, AND COMPUTER PROGRAMS FOR PROVIDING OPTICAL NETWORK CHANNEL PROTECTION

BACKGROUND

Field

Example aspects described herein relate generally to optical communication networks, and, more particularly, to methods, apparatuses, systems, and computer programs for providing protection for optical communication network channel connections.

Description of the Related Art

Network failures, such as fiber cuts, network element failures, and/or failures or defects of one or more individual optical channels (i.e., wavelengths), can have a great impact on networks and can often cause decreased network availability for a large portion of a network. Various techniques have been used to provide protection of optical network connections through the use of redundant or backup communication paths, on a per-fiber basis or a per-channel basis.

One conventional technique for protecting a wavelength division multiplexed (WDM) optical network signal employs an optical channel monitor (OCM) and a WDM switch in a network element. The OCM sweeps through each channel of the WDM signal and provides an optical power level measurement for each channel. Then, based on the power level measurements provided by the OCM, the WDM switch routes the entire WDM signal, including all its constituent channel signals, through either a working path or a protection path. For example, if the power level measurement for the working path is lower than the power level measurement for the protection path (e.g., owing to a failure or defect affecting the working path), then the WDM switch may route the WDM signal through the protection path.

One advantage of employing an OCM and a WDM switch to provide network protection is that multiple optical channels included in a WDM signal may be protected by using a single OCM. However, because this technique employs WDM switches, this technique does not enable separate switching (and thus separate protection) of individual optical channels. Also, because this technique reserves entire fibers as protection paths instead of individual channels, it can be impractical to use this technique to protect mesh networks, which typically include a large number of fibers and channels. Additionally, because of the considerable time it can take for an OCM to successively measure power levels for each channel, OCMs often do not enable detection of signal defects at a rate sufficiently high to enable fast switching times, such as those that may be demanded for certain types of high-priority network traffic (e.g., digital telephone traffic).

A conventional technique for protecting an individual channel optical network signal employs, in a network element, an optical protection switching module (OPSM) including a photodetector. The photodetector provides an optical power level measurement for the signal. Then, based on the power level measurement provided by the photodetector, the OPSM routes the signal through either a working path or a protection path.

One advantage of employing an OPSM and a photodetector to provide network protection is that the photodetector can often detect signal defects at a rate sufficiently high to enable fast switching times demanded for some network traffic. However, since an individual OPSM including a photodetector is needed for each channel, the use of OPSMs and photodetectors to protect optical network connections can become quite costly as the number of optical channels increases.

SUMMARY

Existing limitations associated with the foregoing, as well as other limitations, can be overcome by a procedure for transferring wavelengths, and by a system that operates in accordance with the procedure.

In one example embodiment herein, the system comprises at least one network terminal (e.g., an add/drop terminal), each including a switch and a controller. A plurality of wavelength sets are applied to the switch. Each of the plurality of wavelength sets includes, in one example, a plurality of multiplexed wavelengths. The controller is arranged to operate the switch such that the switch (a) selects at least one wavelength from at least one of the plurality of wavelength sets, based on electrical monitoring at a port module external to the network terminal, and (b) outputs the at least one wavelength to an output of the at least one network terminal.

According to another example embodiment, the system further comprises the port module, which is arranged to receive the at least one wavelength output by the network terminal, convert the at least one wavelength to an electrical signal, and electrically monitor the electrical signal. The port module further is arranged, in some example embodiments, to provide an indication of the electrical monitoring to the controller of the network terminal, and/or electrically monitor the electrical signal for at least one of a loss of signal, a loss of frame, and/or a pre-forward error correction bit error rate.

In some example aspects herein, the port module also is arranged to provide a signal to one of a plurality of inputs of the network terminal, and the network terminal further includes a multiplexer arranged to multiplex signals received over the plurality of inputs of the network terminal to provide a multiplexed signal. The network terminal further comprises, in another example embodiment, a splitter arranged to split a multiplexed signal output by the multiplexer.

Also in one example embodiment herein, the network terminal further includes an optical matrix interposed between the plurality of inputs of the network terminal and the multiplexer, and arranged to route signals received over the plurality of inputs of the network terminal to corresponding ones of a plurality of inputs of the multiplexer.

In a further example embodiment herein, the system further comprises at least one reconfigurable optical add/drop multiplexer (ROADM) arranged for at least one of forwarding the plurality of wavelength sets to the network terminal from a communication network, or forwarding split signals provided by the splitter to the communication network. The port module also can be arranged to provide, based on the electrical monitoring, a control signal to a remote network element by way of the communication network, so that the remote network element selects at least one of the split signals, based on the control signal.

In another example aspect herein, the network terminal further includes a demultiplexer interposed between the switch and the output of the network terminal, and arranged to demultiplex wavelengths output by the switch. The output of the network terminal includes a plurality of outputs, and the network terminal further includes an optical matrix arranged to forward wavelengths demultiplexed by the demultiplexer to corresponding ones of the plurality of the outputs of the network terminal.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

It should be noted that different ones of the Figures may include the same reference numerals to identify the same components, and thus a description of each such component may not be provided herein with respect to each particular Figure.

DETAILED DESCRIPTION

Presented herein is a novel an inventive procedure, and a system, apparatus, and computer program that operate in accordance with the procedure, to protect optical communication network channel connections.

According to one example aspect herein, a network element provides protection of optical network connections by utilizing one or more protection paths in addition to a working path. Each of the paths may be unidirectional or bidirectional, including a transmitting channel and receiving channel. On the transmitting side, the network element transmits a signal (sometimes referred to as an "add" signal because the signal is "added" to the network) to the network via one or more paths (e.g., one working path and one or more protection paths) any of which may be used (e.g., by another network element) at the destination end of the transmitted signal. On the receiving side, the network element receives a signal (sometimes referred to as a "drop" signal because the signal is "dropped" from the network) from the network via one or more paths (e.g., one working path and one or more protection paths). Initially, the network element passes through the signal that was received via the working path and blocks the signals received via the protection paths. If, however, the network element detects at one or more optical and/or electrical monitoring points that the signal received via the working path is defective, then the network element switches to the protection path (i.e., passes the signal received via the protection path and blocks the signal received via the working path).

The use of the electrical monitoring points enables more rapid detection of signal defects than may be possible by using optical monitoring (e.g. OCM) alone, thereby enabling more rapid protection switching in the event the signal becomes defective. Thus, the example embodiments herein can provide high speed protection switching (e.g., less than 50 millisecond switching time) to support various applications that may require rapid switching times. In addition, electrical monitoring enables detection of further types of signal defects as compared to the types of defects detectable using only optical monitoring.

Figure 1:
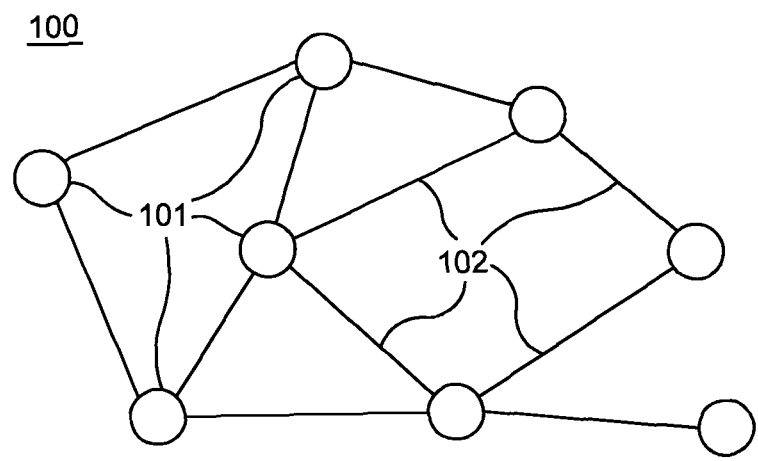
FIG. 1 is a representation of an example communication network that is constructed and operated in accordance with at least one example aspect herein.

Reference will now be made to FIG. 1, which is a representation of an example optical communication network 100 that is constructed and operated in accordance with at least one example aspect herein. In one example embodiment, the network 100 represents an optical transport network or a mesh network, although the network 100 can also represent other types of networks, such as, by example only, an IP network, a virtual private network, and/or the like. The specific topology of the network 100 of FIG. 1 is provided for illustration purposes only, and should not be construed as limiting.

The network 100 includes a plurality of nodes 101 (also referred to herein as "network elements") each representing or including one or more optical signal transmitters, receivers, and/or transceivers configured to transmit and/or receive network traffic signals, such as, by example only, optical signals and/or electrical signals. Although not shown in FIG. 1 for purposes of convenience, each node may also include additional equipment (which can be optical, electrical, and/or opto-electrical), such as, by example only, one or more multiplexers, routers, switches, wavelength selective switches, amplifiers, filters, processors, waveguides, reconfigurable optical add/drop multiplexers (ROADMs), opto-electrical converters, and/or the like. In one example, each node 101 may include one or more transceivers installed in a particular geographical location.

Each of the nodes 101 is communicatively coupled to one or more of the other nodes 101 via a path, which can include one or more links 102. The term "link", as used herein, refers to a communicative coupling between two adjacent communication devices (e.g., nodes), by which the transceivers of the two devices can transmit and/or receive one or more signals to each other.

Example types of paths include a working path and a protection path. A working path is a default path (i.e., the path used in the absence of any associated network failure or defect) by which the particular type of traffic is communicated between the corresponding nodes. The term "active path" is sometimes used to refer to a path (either a working path or a protection path) that is currently selected to carry network traffic. A protection path is an alternate path between the nodes which can be switched into (by, e.g., one or more electrically-controlled optical switches included at a particular node, not shown in FIG. 1) in the event of a failure of the associated working path. A protection path may be required for important traffic and/or traffic that requires fast switching. For example, for telephone traffic, if a working path experiences a failure or a defect, the network should quickly (e.g., in less than 50 milliseconds) switch to an alternate path (i.e., a protection path) because otherwise the telephone call may be dropped.

In one example embodiment, each link 102 is constructed of one or more optical fibers able to carry dense wavelength division multiplexed (DWDM) optical signals thereon, but this example should not be construed as limiting. In other example embodiments, each link 102 can represent a wired communicative coupling, and the signals communicated through the network 100 can include optical signals, electrical signals, and/or electromagnetic signals.

Figure 2:
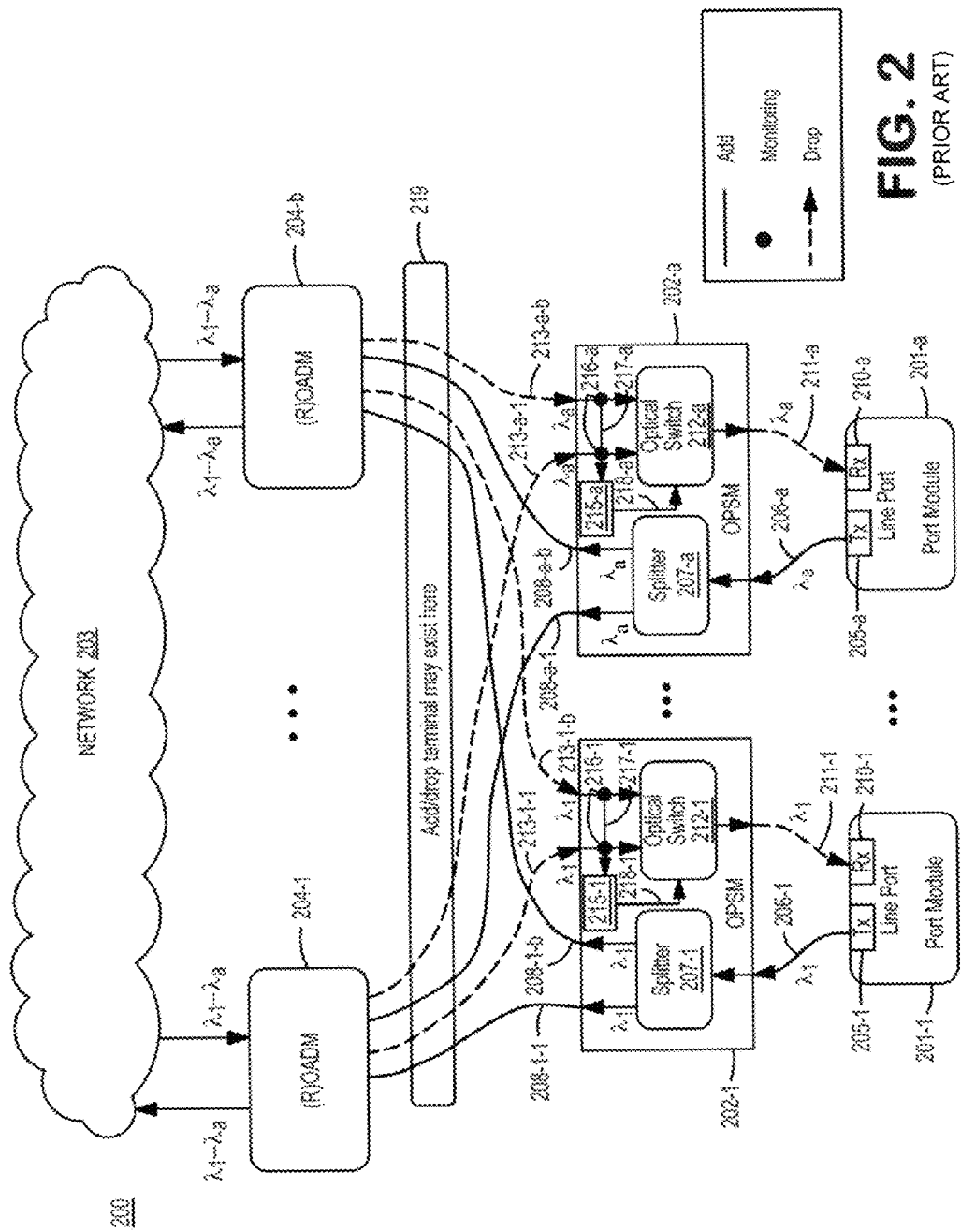
FIG. 2 is an architecture diagram of a conventional system that may be used for protecting optical communication network channel connections.

Having described an example optical communication network 100, an example of a conventional network element of a communication network will now be described, with reference to FIG. 2. FIG. 2 shows an example of a conventional network element 200, such as network element 101, that may be used for protecting optical communication network channel connections.

In general, the network element 200 of FIG. 2 provides protection of optical network connections by utilizing one or more protection paths in addition to a working path (described below). Each of the paths is bidirectional, including a transmitting channel and receiving channel. On the transmitting side, the network element transmits a signal (sometimes referred to as an "add" signal because the signal is "added" to the network) to the network via multiple paths (i.e., one working path and one or more protection paths), any of which may be used (e.g., by another network element) at the destination end of the transmitted signal. On the receiving side, the network element receives a signal (sometimes referred to as an "drop" signal because the signal is "dropped" from the network) from the network via multiple paths (i.e., one working path and one or more protection paths) and, at least initially, uses the signal that was received via the working path. If, however, the network element detects at one or more monitoring points that the signal received via the working path is defective, then the network element switches to using the signal received via the protection path.

Referring now to FIG. 2, the network element 200 includes a plurality of port modules 201-1 to 201-a (e.g., a port modules, where a represents an integer greater than 1) and a plurality of corresponding optical protection switching modules (OPSMs) 202-1 to 202-a. In general, each port module 201-1 to 201-a transmits and receives a single-channel (i.e., single-wavelength) optical signal to and from a network 203 via one or more paths by way of the corresponding OPSM 202-1 to 202-a and a corresponding one of a plurality of ROADMs 204-1 to 204-b (e.g., b ROADMs, where b represents an integer greater than 1). In the example of FIG. 2, each port module 201-1 to 201-a includes a corresponding transmitting module 205-1 to 205-a that communicates a single-channel optical signal to the network 203 via a plurality of paths (e.g., b paths; i.e., one working path and one or more protection paths). In particular, the optical signal 206-1 transmitted by the port module 201-1 is split into b signals 208-1-1 to 208-1-b by a 1:b optical splitter 207-1 in the OPSM 202-1. The splitter 207-1 provides a first of the b signals 208-1-1 to the network 203 via a respective path (e.g., a working path or a protection path) by way of a respective one of the ROADMs 204-1 to 204-b (e.g., the left-most ROADM represented in FIG. 2), and provides a $b^{th}$ one of the plurality of signals 208-1-b to the network 203 via a $b^{th}$ path (e.g., a $(b-1)^{th}$ protection path) by way of a $b^{th}$ one of the ROADMs 204-b (e.g., the right-most ROADM in FIG. 2). In one example embodiment, the path used by the signal 208-1-1 is the working path and the path used by the signal 208-1-b is the $(b-1)^{th}$ protection path.

In some cases, the network element 200 may also optionally include one or more add/drop terminals 219 interposed between the OPSMs 202-1 to 202-a and the ROADMs 204-1 to 204-b. If no add/drop terminal 219 is included in the network element 200, then each of the plurality of OPSMs 202-1 to 202-a are communicably coupled to each of the plurality of ROADMs 204-1 to 204-b via corresponding ones of the plurality (e.g., a×b) of single-channel signals 208-1-1 to 208-a-b and 213-1-1 to 213-a-b. If, on the other hand, one or more add/drop terminals 219 are included in the network element 200, then each of the plurality of OPSMs 202-1 to 201-a (e.g., (e.g., a OPSMs) are communicably coupled to each of the plurality of ROADMs 204-1 to 204-b (e.g., b ROADMs) by way of the one or more add/drop terminals 219 and corresponding ones of WDM signals (not shown in FIG. 2). In other words, the add/drop terminal 219 multiplexes the plurality of single-channel signals 208-1-1 to 208-a-1 into a WDM signal (not shown in FIG. 2) that is provided to the left-most ROADM 204-1; multiplexes the plurality of single-channel signals 208-1-b to 208-a-b into a WDM signal (not shown in FIG. 2) that is provided to the right-most ROADM 204-b; demultiplexes a WDM signal provided by the left-most ROADM 204-1 into its plurality of constituent single-channel signals 213-1-1 to single-channel signal 213-a-1; and demultiplexes a WDM signal provided by the right-most ROADM 204-b into its plurality of constituent single-channel signals 213-1-b to 213-a-b.

Although not shown in FIG. 2 for purposes of convenience, in some example embodiments the network element 200 may also include one or more optical connections between the plurality of ROADMs 204-1 to 204-b to enable one or more optical channel signals to pass through the network element 200 without being added or dropped.

Each port module 201 includes a receiving module 210 that receives a single-channel optical signal 211 from the network 203 by way of a single path selected from a plurality of paths (i.e., a working path and one or more (up to b-1) protection paths). In one example (referring to the left-most receiving module 210-1 for convenience), the receiving module 210-1 receives the optical signal 211-1 from a b×1 optical switch 212-1 in the OPSM 202-1, which selects and transmits, to the receiving module 210-1, either a first signal 213-1-1 received from the network 203 via a first path (e.g., a working path) by way of the left-most ROADM 204-1, or a second signal 213-1-b received from the network 203 via a second path (e.g., one of the one or more protection paths) by way of the right-most ROADM 204-b. Because the example network element 200 shown in FIG. 2 includes one working path and one or more protection paths, this type of protection may be referred to as "1+n" protection.

The selecting of the first signal 213-1-1 or the second signal 213-1-b by switch 212-1 is controlled by a control module 215-1 in the OPSM 202-1. Various optical characteristics (e.g., optical power level, optical signal-to-noise ratio, etc.) of each of the first signal 213-1-1 and the second signal 213-1-b are monitored through the use of photodetectors 216-1 in the OPSM 202-1.

The photodetectors 216-1 measure the power level of the respective signal 213-1-1 or 213-1-b and provide an electrical signal having a voltage that corresponds to the optical power level of the respective optical signal 213-1-1 or 213-1-b. As described in further detail below, the photodetectors 216-1 provide the electrical signals to the control module 215-1, which uses the signals to determine which path to select using the optical switch 212-1.

The control module 215-1 receives the electrical signal 217-1 from the photodetectors 216-1, and determines, based on various criteria (e.g., information conveyed by the signals 217-1), which one of the plurality of signals (e.g., b signals) 213-1-1 to 213-1-b to select (e.g., which of the plurality of signals has better signal characteristics). The control module 215-1 provides an electrical control signal 218-1 to the optical switch 212-1 to cause the switch 212-1 to select signal 213-1-1 or signal 213-1-b (which, in one example, correspond to a working path and a protection path, respectively). In general, the optical switch 212-1 selects and transmits to the receiving module 210-1 the signal 213-1-1 received via the working path, unless a defect is detected in that signal 213-1-1 by a control module (not shown in FIG. 2); in which case, the optical switch 212-1 selects and transmits to the receiving module 210-1 the signal 213-1-b received via one of the one or more protection paths.

Because each OPSM 202 provides protection for only a single optical channel, in order to provide protection for each of multiple add/drop optical channels of an optical add/drop network element using OPSMs, an individual OPSM is needed for each add/drop optical channel. Because an individual OPSM, including a photodetector, is needed for each channel, the use of OPSMs and photodetectors to protect optical network connections can become quite costly as the number of optical channels increases.

Having described an example of a conventional network element 200, reference will now be made to FIG. 3, to describe an example network element 300 that may be used for protecting optical communication network channel connections in accordance with an example embodiment described herein. In one example embodiment, the network element 300 may further represent, and/or be included in, individual ones of the network elements 101 of FIG. 1.

Before describing the network element 300 in detail, a general description of its functionality will now be given. In general, the network element 300 of FIG. 3 provides protection of optical network connections by utilizing one or more protection paths in addition to a working path. Each of the paths is bidirectional, including a transmitting channel and receiving channel.

The network element 300 can provide two different types of protection, "1+n" protection and "1:n" protection. Example embodiments of a 1+n protection scheme will be described below in the context of FIGS. 3 to 5, and an example embodiment of a 1:n protection scheme will be described below in the context of FIG. 6. With 1+n protection, a working path is protected by n protection paths. On the transmitting side, the network element transmits a signal (sometimes referred to as an "add" signal because the signal is "added" to the network) to the network via multiple paths (i.e., a working path and one or more (e.g., n) protection paths), any of which may be used (e.g., by another network element) at the destination end of the transmitted signal. On the receiving side, the network element receives a signal (sometimes referred to as a "drop" signal because the signal is "dropped" from the network) from the network via the multiple paths (i.e., the working path and the one or more protection paths) and, in the absence of a failure of the working path, uses the signal that was received via the working path. If, however, the network element detects at one or more optical and/or electrical monitoring points that the signal received via the working path is defective, then the network element switches to using the signal received via the protection path.

With 1:n protection, a working path is also protected by up to n protection paths. For example, on the transmitting side, the network element transmits a signal to the network via one path only (e.g., the working path) at any given time. Although the signal is split into multiple signals, which are provided to multiple ROADMs, respectively, only one of the ROADMs (e.g., a ROADM of the working path) permits the signal to pass and the other ROADMs (e.g., ROADMs of the n protection paths) block the signal. When not being used for protection purposes, the n protection paths can either be left idle or can be used to carry extra traffic (e.g., low priority traffic). If the working path experiences a failure while a particular protection path is carrying extra traffic, the extra traffic is dropped and the protection path is used to carry the traffic that was previously being carried by the working path. This is unlike the 1+n protection scheme, which reserves the n protection paths for protection purposes and does not allow the protection paths to carry any extra traffic. In addition, in the 1+n protection scheme, for a given traffic flow, switching is performed only on the receiving side (i.e., by a network element receiving the traffic flow). This is because in the 1+n protection scheme each of the multiple paths (i.e., the working path and the one or more protection paths) on the transmitting side carries a copy of the same transmitted signal, regardless of which path currently is the working path and which paths currently are protection paths. In the 1:n protection scheme, switching is performed on both the transmitting side and the receiving side (i.e., by a network element transmitting the traffic flow and a network element receiving the traffic flow), in order to coordinate which of the paths (e.g., the working path or the one or more protection paths) are to be used for one or more particular traffic flows at any given time. According to one example embodiment herein, in-band and/or out-of-band messages are communicated between the transmitting and receiving network elements to coordinate which paths are to be used for particular traffic flows.

Figure 3:
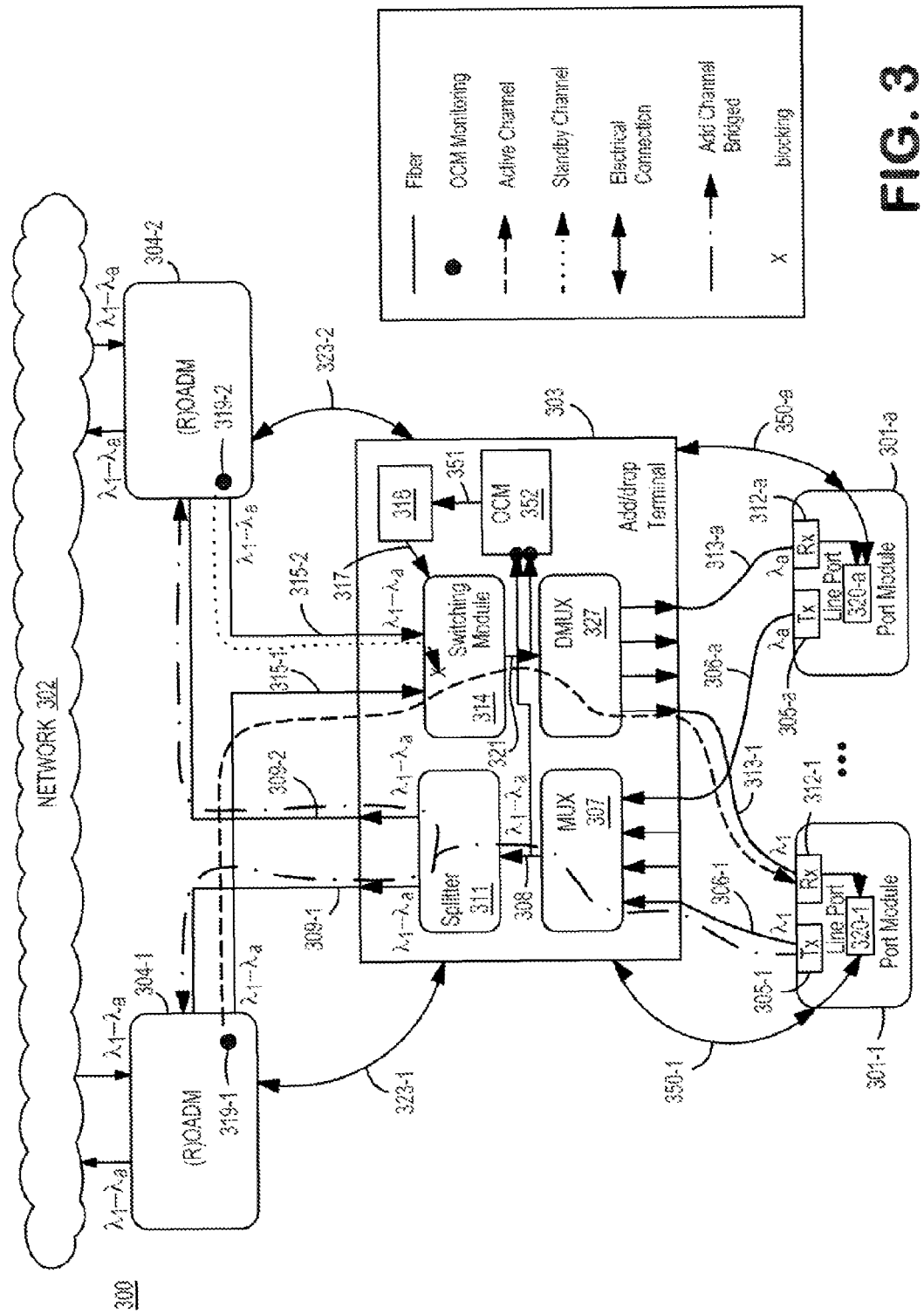
FIG. 3 is an example architecture diagram of a system that may be used for protecting optical communication network channel connections, in accordance with an example embodiment described herein.

Reference will now be made to FIG. 3 to describe an example network element 300 that may be used to provide "1+1" protection of optical communication network channel connections, in accordance with one example embodiment. Then, reference will be made to FIG. 4 to describe an example network element 400 that may be used to provide "1+n" protection of optical communication network channel connections, in accordance with another example embodiment.

Referring to FIG. 3, the network element 300 includes a plurality of port modules 301-1 to 301-a (e.g., a port modules, where a represents an integer greater than 1). For the purpose of convenience, in the following description reference will be made to signals and/or components corresponding to a first wavelength channel (e.g., port module 301-1, transmitting module 305-1, receiving module 312-1, signal 306-1, signal 313-1); although a similar description is applicable for signals and/or components corresponding to the other wavelength channel(s) (e.g., port module 301-a, transmitting module 305-a, receiving module 312-a, signal 306-a, signal 313-a).

Each port module 301-1 transmits a single-channel (i.e., single-wavelength) optical signal 306-1-1 to the network 302 via one or more paths by way of an add/drop terminal 303 (and one or more of the ROADMs 304-1 to 304-2). In the example of FIG. 3, the port module 301-1 includes a transmitting module 305-1 that is capable of broadcasting a single-channel (e.g., $\lambda_1$) optical signal 306-1 to the network 302 via two diverse bridged paths (i.e., a working path and a protection path). During normal operation, i.e., in the absence of a failure, the port module 301-1 broadcasts the single-channel optical signal 306-1 to the network 302 via a working path, with a protection path being reserved for use in the event of a failure.

In particular, in one example embodiment, the single-channel optical signals 306-1 to 306-a transmitted by the port modules 301-1 to 301-a, respectively, are wavelength division multiplexed (WDM) by an optional multiplexer 307 into a multiple-channel (e.g., $\lambda_1$ to $\lambda_a$) WDM signal 308 carried in at least one optical fiber. The WDM signal 308 is then split into two WDM signals—a first WDM signal 309-1 and a second WDM signal 309-2—by a 1:2 optical splitter 311 in the add/drop terminal 303. The first WDM signal 309-1 is transmitted to a first (left-most in FIG. 3) one of the ROADMs 304-1, and the second WDM signal 309-2 is transmitted to the second (right-most in FIG. 3) one of the ROADMs 304-2. Either one of the first WDM signal 309-1 or the second WDM signal 309-2 is designated as the signal of the working path, and the other one of the first WDM signal 309-1 or the second WDM signal 309-2 is designated (e.g., by a network element management system, not shown in FIG. 3) as the signal of the protection path. The signal of the working path is forwarded to the network 302 by its corresponding one of the ROADMs 304, and the signal of the protection path is blocked by its corresponding one of the ROADMs 304 (e.g., by using a switch included in the ROADMs (not shown in FIG. 3), such as a WSS or an optical matrix switch, that is suitable for per-channel switching).

The port module 301-1 also includes a receiving module 312-1 that receives a single-channel optical signal 313-1 from the network 302 by way of a single path selected from two paths (i.e., a working path and a protection path). In particular, a switching module 314 (e.g., a wavelength selective switch (WSS) or an optical matrix switch with multiplexing and/or demultiplexing functionality, as described further below) of the add/drop terminal 303 receives a first WDM signal 315-1 (e.g., a working path signal) by way of a first (left-most in FIG. 3) one of the ROADMs 304-1 and a second WDM signal 315-2 (e.g., a protection path signal) by way of a second (right-most in FIG. 3) one of the ROADMs 304-2. Because the example network element 300 shown in FIG. 3 includes one working path and one protection path, the protection provided by network element 300 may be referred to as "1+1" protection.

The switching module 314 can be any optical switching module, such as a wavelength selective switch (WSS) or an optical matrix switch with multiplexing and/or demultiplexing functionality, that is suitable for per-channel (i.e., per-wavelength) switching. The switching module 314 operates by permitting selected channels from the WDM signals 315-1 and 315-2 to pass through the switching module 314 and by blocking other, non-selected channels from the WDM signals 315-1 and 315-2, based on a control signal 317 provided to the switching module 314 by the control module 318. The switching module 314 receives the two WDM signals 315-1 and 315-2 and outputs a single WDM signal 321 that includes channels selected from the WDM signals 315-1 and 315-2. To avoid wavelength contention only a single channel for a particular wavelength preferably is selected at any given time. For example, if each of the WDM signals 315-1 and 315-2 includes a channel having a wavelength of 1550 nm, then the switching module 314 may only permit one of the 1550 nm channels of the WDM signals 315-1 and 315-2 to pass and blocks the other one of the 1550 nm channels of the WDM signals 315-1 and 315-2.

In one example embodiment, the switching module 314 switches between WDM signals by permitting each channel (e.g., each wavelength $\lambda_1$ to $\lambda_a$) of either the first WDM signal 315-1 or the second WDM signal 315-2 to pass through the switching module 314 while blocking each channel (e.g., each wavelength $\lambda_1$ to $\lambda_a$) of the other one of the WDM signals 315-1 or 315-2. In another example embodiment, the switching module 314 switches between individual channels (e.g., wavelengths) of signals 315-1 and 315-2 by permitting one or more individual channels (e.g., wavelength $\lambda_1$) of the WDM signals 315-1 and/or 315-2 to pass through the switching module 314 while blocking one or more other ones of the individual channels (e.g., wavelength $\lambda_n$) of the WDM signals 315-1 and/or 315-2.

As described below in further detail, the control module 318 determines in a known manner which of the channels of signals 315-1 and 315-2 to select based on various criteria (e.g., based on one or more predetermined rule(s) and/or based on signals provided to the control module 318 by one or more of monitoring modules 319-1, 319-2, and/or 320-1 to 320-a (described below) indicating whether a working or protection path has become defective).

In one example embodiment, the control module 318 in the add/drop terminal 303 controls the selecting of a channel of the first WDM signal 315-1 or the second WDM signal 315-2 based on information received via electrical signals (e.g., electrical signals 323-1, 323-2, and/or 350-1 to 350-a, described below) from various monitoring points, such as OCM 352, OCM 319-1, OCM 319-2, and/or one or more of monitoring modules 320-1 to 320-a. The OCM 352 in the add/drop terminal 303 monitors optical characteristics (e.g., optical power level, optical signal-to-noise ratio, whether the signal is degraded, whether optical performance is sufficient, etc.) of the WDM signal 321 of the working path (i.e., the path corresponding to the signal 321 currently being passed by the switching module 314). The OCM 319-1 of the first, left-most ROADM 304-1 monitors optical characteristics of the WDM signal 315-1 of the working path. The OCM 319-2 of the second, right-most ROADM 304-2 monitors optical characteristics of the WDM signal 315-2 of the protection path. Although not shown in FIG. 3 for purposes of convenience, in one example embodiment, each ROADM 304-1 to 304-2 also includes one or more of the components of add/drop terminal 303 (e.g., multiplexer 307, splitter 311, switching module 314, control module 318, OCM 352, and/or demultiplexer 327).

In addition to the OCM monitoring of the optical characteristics of WDM signals 315-1, 315-2, 321 at the OCMs 319-1, 319-2 of the ROADMs 304-1, 304-2 and/or the OCM 352 of the add/drop terminal 303, each port module 301-1 to 301-a includes a monitoring module 320-1 to 320-a that monitors both optical and electrical characteristics (e.g., a loss of signal, a loss of frame, a pre-forward error correction bit error rate, a low optical signal to noise ratio, etc.) of the respective single-channel signal 313-1 to 313-a of the working path. In one example embodiment, each monitoring module 320-1 to 320-a includes an opto-electrical converter (not shown in FIG. 3) that converts the respective optical signal 313-1 to 313-a to an electrical signal to enable electrical domain monitoring (although in other embodiments monitoring is performed in the optical domain). In another example embodiment, each receiving module 320-1 to 320-a converts the respective optical signal 313-1 to 313-a to an electrical signal to enable electrical domain monitoring.

By monitoring the electrical characteristics of the single-channel signal 313-1 of the working path in the port module 301-1, defects of the signal 313-1 may be detected more rapidly, thereby enabling more rapid protection switching in the event the signal 313-1 becomes defective.

In addition, electrically monitoring the single-channel signal 313-1 of the working path in the port module 301-1 enables detection of further types of defects of the signal 313-1 as compared to the types of defects detectable using optical monitoring. For example, the monitoring module 320-1 of the port module 301-1 can perform decoding and/or other digital processing of the signal to detect errors present in digital bits of the signal that may not be detectable using optical channel monitoring.

Thus, not only can the example embodiments herein provide network protection through defect detection in the optical domain (which, as described above, may be relatively slow), the embodiments herein can also provide high speed (e.g., less than 50 millisecond switching time) network protection through defect detection in the electrical domain. Thus, the example embodiments herein can provide high speed protection switching to support various applications that may require rapid switching times. Moreover, performing electrical monitoring in the port modules 301-1 to 301-a is a cost-effective solution that enables high speed protection switching without the need for additional dedicated standalone high speed defect detection modules to be added to network element 300.

The control module 318 receives the electrical signals 323-1 to 323-2 from the OCMs 319-1 and 319-2 and receives the electrical signals 350-1 to 350-a from the monitoring modules 320-1 to 320-a, respectively. Although not shown in FIG. 3 for purposes of convenience, the electrical signals 323-1, 323-2, and 320-1 to 320-a are coupled to the control module 318 (e.g., by way of electrical wire traces in an electrical backplane). The control module 318 then determines, based on various criteria (e.g., one or more predetermined rule(s) and/or information conveyed by the signals 323-1, 323-2, 320-1 to 320-a), which one(s) of the channels of signals 315-1 or 315-2 (i.e., the signals in the protection group) to select. In one example embodiment, the control module 318 may make a determination based on a predetermined rule dictating that, if an optical power level of the signal of the working path (e.g., as measured at one or more of the OCMs 319-1, 319-2, 352 (for a WDM signal) and/or the monitoring module 320-1 (for a single-channel signal)) falls below a predetermined critical optical power threshold, then the switching module 314 is to switch to a protection path. Other criteria upon which the control module 318 can make the above determination can include, by example only, detection of an OSNR difference between two or more signals measured at one or more of the OCMs 319-1, 319-2, 352 and/or at the monitoring module 320-1, whether one or more of the OCMs 319-1, 319-2, 352 and/or the monitoring module 320-1 detects a traffic outage defect for the working path, and/or the like.

Once the control module 318 has determined which channel(s) of the signals 315-1 and 315-2 to select, the control module 318 provides the electrical control signal 317 to the switching module 314 to cause the switching module 314 to select the particular channels of signal 315-1 and/or signal 315-2 (certain channels of which, in one example, may correspond to a working path or a protection path).

In response to receiving the control signal 317 from the control module 318 in the add/drop terminal 303, the switching module 314 selects channel(s) of the first signal 315-1 received via the first path (e.g., the working path) and/or channels of the second signal 315-2 received via the second path (e.g., the protection path), based on various criteria (e.g., one or more predetermined rule(s) and/or information conveyed by the signals 323-1, 323-2, 320-1 to 320-a). The switching module 314 transmits the WDM signal 321, including the selected channel(s), to a demultiplexer 327 that demultiplexes the signal 321 into a plurality of constituent individual wavelength channel signals 313-1 to 313-a (e.g., a signals, where a represents an integer greater than 1). The individual wavelength channel signals 313-1 to 313-a are provided to respective receiving modules 312-1 to 312-a of corresponding port modules 301-1 to 301-a.

As can be appreciated in view of the above description of FIG. 3, a single add/drop terminal 303 included in the network element 300 may be utilized to provide 1+1 protection for multiple optical channels included in a WDM signal, while enabling separate switching (and thus separate protection) of individual optical channels. Additionally, the use of the electrical monitoring points (e.g., one or more of monitoring modules 320-1 to 320-a) in addition to optical monitoring (e.g., OCM 352, OCM 319-1, and/or OCM 319-2) enables more rapid detection of signal defects than may be possible by using optical monitoring (e.g. OCM) alone, thereby enabling detection of signal defects at a rate sufficiently high to enable fast switching times, such as those that may be demanded for certain types of high-priority network traffic (e.g., digital telephone traffic). In addition, electrical monitoring enables detection of further types of signal defects as compared to the types of defects detectable using only optical monitoring.

Figure 4:
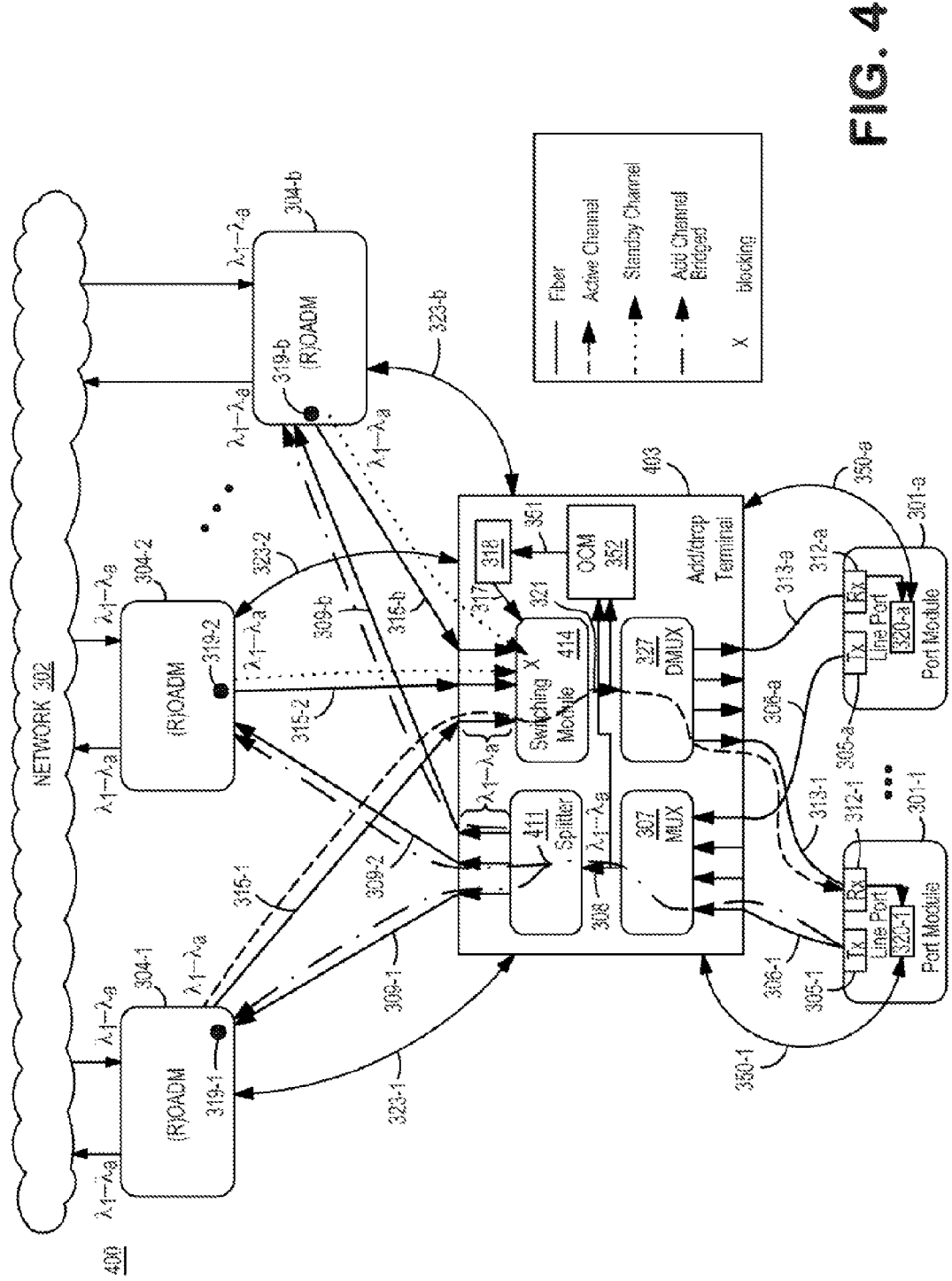
FIG. 4 is another example architecture diagram of a system that may be used for protecting optical communication network channel connections, in accordance with an example embodiment described herein.

Reference will now be made to FIG. 4, which shows an example network element 400 that may be used for protecting optical communication network channel connections (e.g., in a mesh network) in accordance with an example embodiment described herein. In particular, FIG. 4 shows a network element 400 that provides high order protection (i.e., "1+n" protection, where n is an integer greater than 1). In one example embodiment, the network element 400 may further represent, and/or be included in, individual ones of the network elements 101 of FIG. 1.

As can be appreciated in view of FIGS. 3 and 4, the network element 400 of FIG. 4 includes many of the same components of the network element 300 of FIG. 3 (described above), and thus a description of each component of FIG. 4 may not be provided herein.

One difference between the network elements 300 and 400 is that, whereas the network element 300 includes two ROADMs (ROADM 304-1 and ROADM 304-2), the network element 400 includes a plurality of ROADMs 304-1 to 304-b (e.g., b ROADMs, where b equals n+1 and b represents an integer greater than 1). In one example embodiment, the n+1 ROADMs 304-1 to 304-b enable the network element 400 to provide "1+n" protection (i.e., protection of a working path by using n protection paths). For example, a first (left-most in FIG. 4) one of the ROADMs 304-1 can correspond to a working path, while a second (middle in FIG. 4) one of the ROADMs 304-2 can correspond to a first protection path, and an $(n+1)^{th}$ (right-most in FIG. 4) one of the ROADMs 304-b can correspond to an $n^{th}$ protection path.

In a manner similar to that described above with respect to FIG. 3, in FIG. 4 each port module 301-1 to 301-a is capable of transmitting a single-channel optical signal 306 to the network 302 via one or more paths by way of an add/drop terminal 403 and one or more of the ROADMs 304-1 to 304-b. For the purpose of convenience, in the following description reference will be made to signals and/or components corresponding to a first wavelength channel (e.g., port module 301-1, transmitting module 305-1, receiving module 312-1, signal 306-1, signal 313-1); although a similar description is applicable for signals and/or components corresponding to the other wavelength channel(s) (e.g., port module 301-a, transmitting module 305-a, receiving module 312-a, signal 306-a, signal 313-a).

In the example of FIG. 4, the port module 301-1 includes a transmitting module 305-1 that is capable of broadcasting a single-channel optical signal 306-1 to the network 302 via one of a plurality of diverse bridged paths (e.g., b paths, where b equals n+1, and where b represents an integer greater than 1) (i.e., one working path and n protection paths). During normal operation, i.e., in the absence of a failure, the port module 301-1 broadcasts the single-channel optical signal 306-1 to the network 302 via a working path, with n protection paths being reserved for use in the event of a failure.

In particular, in one example embodiment, each of the single-channel optical signals 306-1 to 306-a transmitted by the port modules 301-1 to 301-a, respectively, is wavelength division multiplexed (WDM) by an optional multiplexer 307 into a multiple-channel WDM signal 308 carried in at least one optical fiber. Another difference between the network element 400 and the network element 300 of FIG. 3 is that, whereas the optical splitter 311 of the network element 300 is a 1:2 optical splitter, the optical splitter 411 of the network element 400 is a 1:b optical splitter (where b equals n+1). The WDM signal 308 is then split into b WDM signals 309-1 to 309-b by the 1:b optical splitter 411 in the add/drop terminal 403. A first WDM signal 309-1 is transmitted to a first (left-most in FIG. 4) one of the ROADMs 304-1; a second WDM signal 309-2 is transmitted to a second (middle in FIG. 4) one of the ROADMs 304-2; and a $b^{th}$ WDM signal 309-b is transmitted to an $b^{th}$ (right-most in FIG. 4) one of the ROADMs 304-b. Each constituent channel (wavelength) of the first WDM signal 309-1, the second WDM signal 309-2, and the $b^{th}$ WDM signal 309-b is designated (e.g., by a network element management server, not shown in FIG. 4) as either a working path, or a protection path. During normal operation (i.e., in the absence of a failure), the working path channels of the first WDM signal 309-1, the second WDM signal 309-2, and the $b^{th}$ WDM signal 309-b are forwarded to the network 302 by its corresponding one of the ROADMs 304-1 to 304-b, and the protection path channels of the first WDM signal 309-1, the second WDM signal 309-2, and the $b^{th}$ WDM signal 309-b are blocked by their corresponding ones of the ROADMs 304-1 to 304-b.

The port module 301-1 also includes a receiving module 312-1 that receives a single-channel optical signal 313-1 from the network 302 by way of a single path selected from b paths (i.e., a working path and n protection paths). Another difference between the network element 400 and the network element 300 of FIG. 3 is that, whereas the switching module 314 of the network element 300 is a 2×1 switching module, the switching module 414 of the network element 400 is a b×1 switching module. In FIG. 4, the switching module 414 of the add/drop terminal 403 receives a first WDM signal 315-1 (e.g., a working path signal) by way of a first (left-most in FIG. 4) one of the ROADMs 304-1; receives a second WDM signal 315-2 (e.g., a first protection path signal) by way of a second (middle in FIG. 4) one of the ROADMs 304-2; and receives an $b^{th}$ WDM signal 315-b (e.g., an $n^{th}$ protection path signal) by way of a $b^{th}$ (right-most in FIG. 4) one of the ROADMs 304-b. Because the example network element 400 shown in FIG. 4 includes one working path and n protection paths, the protection provided by network element 300 may be referred to as "1+n" protection.

In a manner similar to that described above in the context of FIG. 3, the switching module 414 of FIG. 4 can be any optical switching module, such as a wavelength selective switch (WSS) or an optical matrix switch, that is suitable for per-channel (i.e., per-wavelength) switching. The switching module 414 operates by permitting selected channels from the b WDM signals 315-1, 315-2, . . . 315-b to pass through the switching module 414 and by blocking other, non-selected channels from the b WDM signals 315-1, 315-2, . . . 315-b, based on a control signal 317 provided to the switching module 414 by the control module 318. As described above in further detail in the context of FIG. 3, the control module 318 determines which channels of the WDM signals 315-1, 315-2, . . . 315-b to select based on various criteria.

Once the control module 318 has determined which channel(s) of the b signals 315-1, 315-2, . . . 315-b to select, the control module 318 provides the electrical control signal 317 to the switching module 414 to cause the switching module 414 to select the particular channels of signals 315-1, 315-2, . . . 315-b (certain channels of which, in one example, correspond to a working path or a protection path).

In response to receiving the control signal 317 from the control module 318 in the add/drop terminal 303, the switching module 414 selects channel(s) of the first signal 315-1 received via the first path (e.g., the working path), channel(s) of the second signal 315-2 received via the second path (e.g., the first protection path), and/or channel(s) of the $b^{th}$ signal 315-b received via the $b^{th}$ path (e.g., an $n^{th}$ protection path). The switching module 414 transmits the WDM signal 321 to a demultiplexer 327 that demultiplexes the signal 321 into a plurality of constituent individual wavelength channel signals 313-1 to 313-a (e.g., a signals, where a represents an integer greater than 1). The individual wavelength channel signals 313-1 to 313-a are provided to respective receiving modules 312-1 to 312-a of corresponding port modules 301-1 to 301-a.

As can be appreciated in view of the above description of FIG. 4, a single add/drop terminal 403 included in the network element 400 may be utilized to provide "1+n" protection for multiple optical channels included in a WDM signal, while enabling separate switching (and thus separate protection) of individual optical channels. Additionally, the use of the electrical monitoring points (e.g., one or more of monitoring modules 320-1 to 320-a) in addition to optical monitoring (e.g., OCM 352, and/or OCM 319-1 to OCM 319-b) enables more rapid detection of signal defects than may be possible by using optical monitoring (e.g. OCM) alone, thereby enabling detection of signal defects at a rate sufficiently high to enable fast switching times, such as those that may be demanded for certain types of high-priority network traffic (e.g., digital telephone traffic). In addition, electrical monitoring enables detection of further types of signal defects as compared to the types of defects detectable using only optical monitoring.

Figure 5:
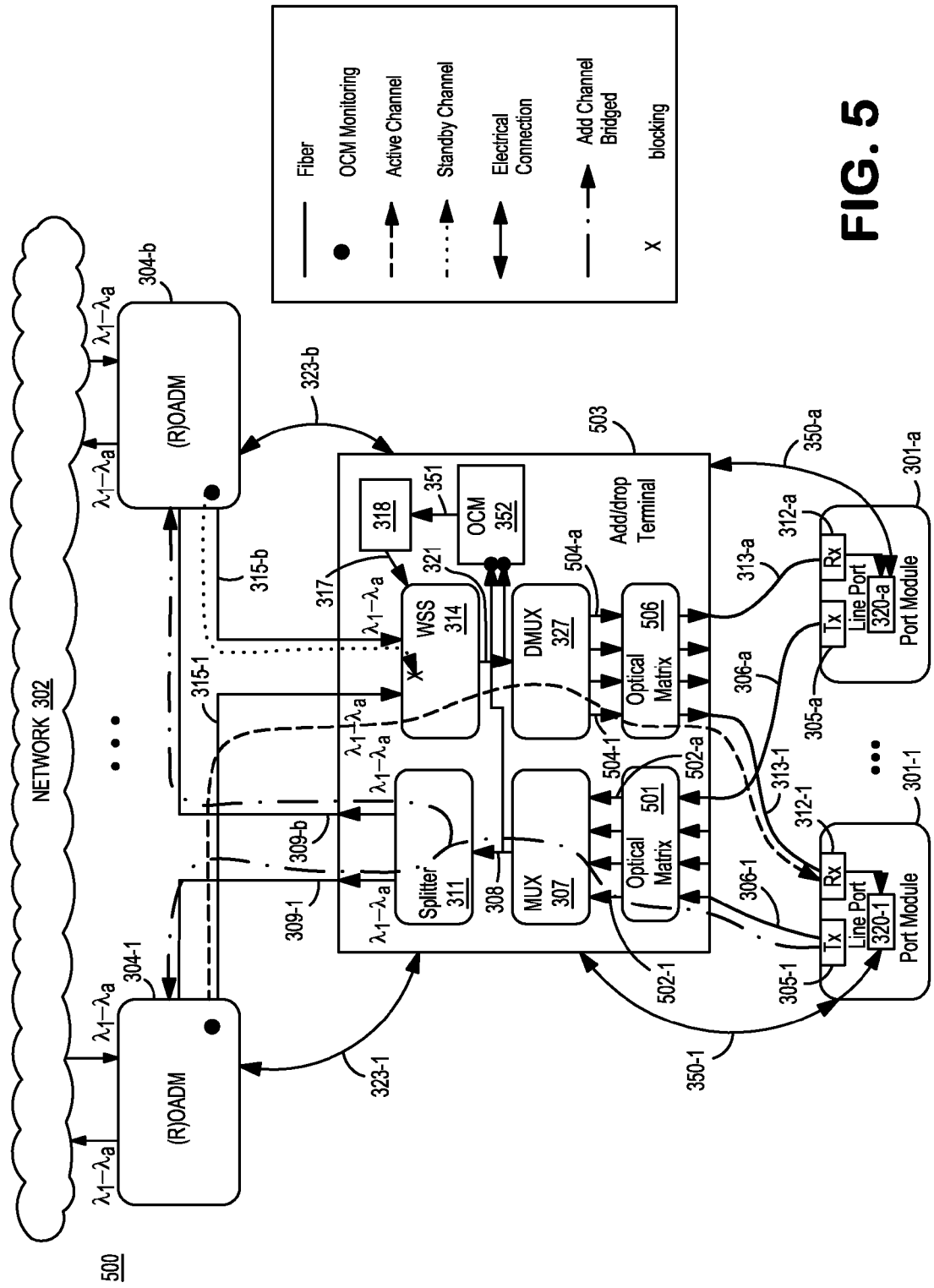
FIG. 5 is an example architecture diagram of a system that may be used for providing colorless protection of optical communication network channel connections, in accordance with an example embodiment described herein.

Reference will now be made to FIG. 5 to describe a colorless network element 500 that may be used to provide colorless protection of optical communication network channel signals, in accordance with one example embodiment herein. As can be appreciated in view of FIGS. 3 and 5, the network element 500 of FIG. 5 includes many of the same components of the network element 300 of FIG. 3 (described above), and thus a description of each component of FIG. 5 may not be provided herein, where there is overlap.

In addition to the same components as those shown in FIG. 3, the add/drop terminal 503 shown in FIG. 5 also includes an optical matrix 501 interposed between the port modules plurality of 301-1 to 301-a and the multiplexer 307 (or the splitter 311 if the terminal 503 does not include the optional multiplexer 307) and includes an optical matrix 506 interposed between the demultiplexer 327 (or the switching module 314 if the terminal 503 does not include the optional demultiplexer 327) and the plurality of port modules 301-1 to 301-a. The optical matrix 501 operates by routing each single-channel (i.e., single-wavelength) signal 306-1 to 306-a received at a corresponding one of its multiple input ports to any one of its multiple output ports 502-1 to 502-a, based on configuration instructions provided to the optical matrix 501 (e.g., by a network element management system, not shown in FIG. 5). The optical matrix 506 operates by routing each single-channel (i.e., single-wavelength) signal 504-1 to 504-a received at a corresponding one of its multiple input ports to any one of its multiple output ports 313-1 to 313-a. Because the add/drop terminal 503 includes optical matrices 501 and 506 that operate in this manner the add/drop terminal 503 is referred to as a colorless add/drop terminal. That is, the add/drop terminal 503 is colorless in that, rather than being limited to a specific wavelength, each port module 301-1 to 301-a may use any available wavelength of a plurality of wavelengths (e.g., $\lambda_1$ to $\lambda_a$), so long as wavelength contention is avoided. In other words, each port module 301-1 to 301-a can be configured (e.g., by a network element management system, not shown in FIG. 5) to use any particular wavelength (e.g., $\lambda_1$ to $\lambda_a$) so long as no two port modules from among the port modules 301-1 to 301-a communicating with a particular optical matrix 501 are using the same wavelength at the same time. For example, the port module 301-1 may use wavelength $\lambda_2$ so long as no other port module from among port modules 301-2 to 301-a are using wavelength $\lambda_2$. According to one example embodiment herein, the colorless network element 500 can be used to provide protection of optical communication network channel signals in cases where a wavelength of a working path is different from a wavelength of one or more protection paths. At least one of the wavelength of the working path and the wavelength(s) of the one or more protection paths may be converted using one or more wavelength converters (not shown in FIG. 5), in one example.

Although not shown in FIG. 5 for purposes of convenience, in one example embodiment a wavelength selective switch (WSS) having multiple input/output ports (e.g., add/drop ports) is included in the add/drop terminal 503 instead of the multiplexer 307, the demultiplexer 327, and the optical matrixes 501 and 506. In this case, ports of the WSS (not shown in FIG. 5) are communicatively coupled to: (1) the port modules 301-1 to 301-a, by way of signals 306-1 to 306-a and 313-1 to 313-a; (2) the splitter 311, by way of the signal 308; and (3) the switching module 314, by way of the signal 321. In this manner, colorless protection of optical communication network channel signals can be provided by using the WSS (not shown in FIG. 5) to route individual wavelength channel signals from and to particular ones of the plurality of port modules 301-1 to 301-a, which, in one example, are selected based on configuration instructions provided to the WSS (e.g., by a network element management system, not shown in FIG. 5).

In another example embodiment herein, although not shown in FIG. 5 for purposes of convenience, a wavelength selective switch (WSS) having multiple input/output ports (e.g., add/drop ports) is included in the add/drop terminal 503 instead of the splitter 311. In this case, the WSS (not shown in FIG. 5) can be used as part of a route-and-select architecture. That is, instead of splitting the signal 308 into the plurality of signals 309-1 to 309-b and providing the plurality of signals 309-1 to 309-b to the plurality of ROADMs 304-1 to 304-b, the WSS (not shown in FIG. 5) provides the signal 308 to a selected one or more of the ROADMs 304-1 to 304-b only, and does not provide the signal 308 to the other, non-selected one or more of the ROADMs 304-1 to 304-b. In one example, the one or more of the ROADMs 304-1 to 304-b are selected based on configuration instructions provided to the WSS (e.g., by a network element management system, not shown in FIG. 5).

As can be appreciated in view of the above description of FIG. 5, a single add/drop terminal 503 included in the network element 500 may be utilized to provide colorless protection for multiple optical channels included in a WDM signal, while enabling separate switching (and thus separate protection) of individual optical channels. Thus, by using the colorless add/drop terminal 503 for network protection, it is possible to provide network protection that is flexible in that each port module can use any wavelength (subject to wavelength contention, as described above) for working or protection paths. Additionally, the use of the electrical monitoring points (e.g., one or more of monitoring modules 320-1 to 320-a) in addition to optical monitoring (e.g., OCM 352, and/or OCM 319-1 to OCM 319-b) enables more rapid detection of signal defects than may be possible by using optical monitoring (e.g. OCM) alone, thereby enabling detection of signal defects at a rate sufficiently high to enable fast switching times, such as those that may be demanded for certain types of high-priority network traffic (e.g., digital telephone traffic). In addition, electrical monitoring enables detection of further types of signal defects as compared to the types of defects detectable using only optical monitoring.

Having described various example embodiments for providing 1+n protection of optical communication network channel connections, reference will now be made to FIG. 6 to describe a network element 600 that may be used to provide 1:n protection of optical communication network channel connections, in accordance with an example embodiment herein. As can be appreciated in view of FIGS. 3 and 6, the network element 600 of FIG. 6 includes many of the same components of the network element 300 of FIG. 3 (described above), and thus a description of each component of FIG. 6 may not be provided herein.

Figure 6:
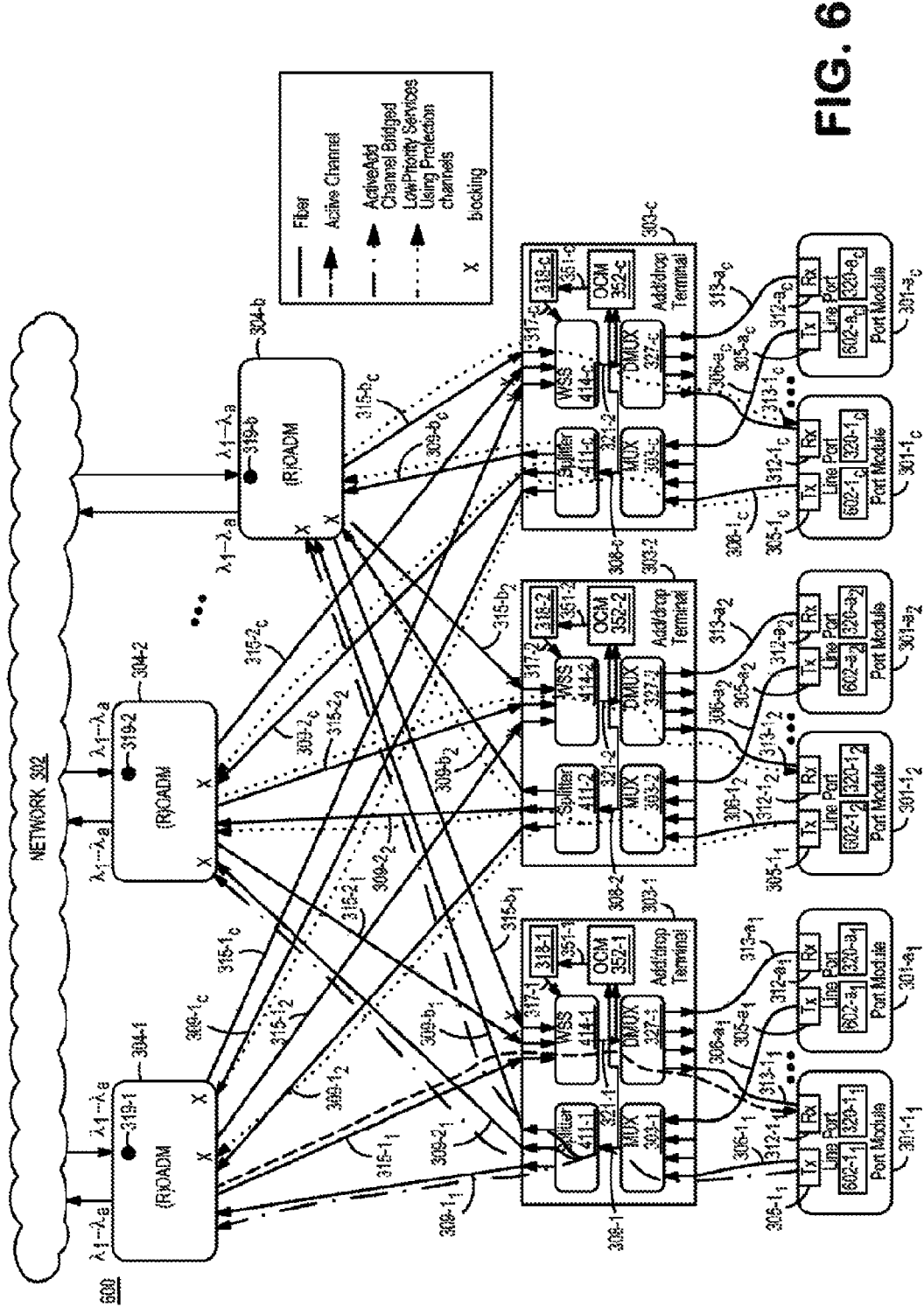
FIG. 6 is an example architecture diagram of a system that may be used for providing 1:n protection of optical communication network channel connections, in accordance with an example embodiment described herein.

Also, although not shown in FIG. 6 for purposes of convenience, one or more components of the port modules 301-1$_1$ to 301-a$_c$, one or more components of the add/drop terminals 303-1 to 303-c, and ROADMs 304-1 to 304-b are communicatively coupled via electrical signals (e.g., by way of electrical wire traces in an electrical backplane) that operate in a similar manner as that described above for signals 323 and/or 350 in the context of FIGS. 3, 4, and 5.

For example, like the network element 300 of FIG. 3, the network element 600 includes a plurality of ROADMs 304-1 to 304-b (e.g., b ROADMs, where b represents an integer greater than 1). However, whereas the network element 300 of FIG. 3 includes one set of port modules 301-1 to 301-a, the network element 600 includes plural sets of port modules (i.e., a first set of port modules 301-1$_1$ to 301-a$_1$, a second set of port modules 301-1$_2$ to 301-a$_2$, and a $c^{th}$ set of port modules 301-1$_c$ to 301-a$_c$ (where a and c each represent an integer greater than 1). In addition, whereas the network element 300 of FIG. 3 includes one set of single-channel signals 306-1 and 313-1, the network element 600 includes plural sets of single-channel signals, one set for each add/drop terminal (i.e., a first set of a×2 single-channel signals 306-1$_1$ to 306-a$_1$ and 313-1$_1$ to 313-a$_1$; a second set of a×2 single-channel signals 306-1$_2$ to 306-a$_2$ and 313-1$_2$ to 313-a$_2$; and a $c^{th}$ set of a×2 single-channel signals 306-1$_c$ to 306-a$_c$ and 313-1$_c$ to 313-a$_c$ (where a, b, and c each represent an integer greater than 1).

Another difference between the network element 600 and the network element 300 of FIG. 3 is that whereas the network element 300 includes one add/drop terminal 303, the network element 600 includes a plurality of add/drop terminals 303-1 to 303-c (e.g., c add/drop terminals, where c represents an integer greater than 1). In addition, whereas the network element 300 of FIG. 3 includes one set of WDM signals 309-1, 309-2, 315-1, and 315-2, the network element 600 includes plural sets of WDM signals, one set for each add/drop terminal (i.e., a first set of b×2 WDM signals 309-1$_1$ to 309-b$_1$ and 315-1$_1$ to 315-b$_1$; a second set of b×2 WDM signals 309-1$_2$ to 309-b$_2$ and 315-1$_2$ to 315-b$_2$; and a $c^{th}$ set of b×2 WDM signals 309-1$_c$ to 309-b$_c$ and 315-1$_c$ to 315-b$_c$ (where a, b, and c each represent an integer greater than 1).

The left-most add/drop terminal 303-1 is in bidirectional communication with the first set of port modules 301-1$_1$ to 301-a$_1$ by way of the first set of single-channel signals 306-1$_1$ to 306-a$_1$ and 313-1$_1$ to 313-a$_1$, and is in bidirectional communication with the ROADMs 304-1 to 304-b by way of the first set of WDM signals 309-1$_1$, 309-2$_1$, 309-b$_1$, 315-1$_1$, 315-2$_1$, and 315-b$_1$. The middle add/drop terminal 303-2 is in bidirectional communication with the second set of port modules 301-1$_2$ to 301-a$_2$ by way of the second set of a×2 single-channel signals 306-1$_2$ to 306-a$_2$ and 313-1$_2$ to 313-a$_2$, and is in bidirectional communication with the ROADMs 304-1 to 304-b by way of the second set of WDM signals 309-1$_2$ to 309-b$_2$ and 315-1$_2$ to 315-b$_2$. The right-most add/drop terminal 303-c is in bidirectional communication with the $c^{th}$ set of port modules 301-1$_c$ to 301-a$_c$ by way of the $c^{th}$ set of single-channel signals 306-1$_c$ to 306-a$_c$ and 313-1$_c$ to 313-a$_c$, and is in bidirectional communication with the ROADMs 304-1 to 304-b by way of the $c^{th}$ set of WDM signals 309-1$_c$ to 309-b$_c$ and 315-1$_c$ to 315-b$_c$.

As mentioned above and as will be described in further detail below, in the 1:n protection scheme a working path is protected by up to n protection paths, and one or more of the protection paths may be used to carry extra traffic (e.g., low priority traffic) during normal operation (i.e., in the absence of a failure). Referring to FIG. 6, on the transmitting side the network element 600 provides a signal 308-1 to the network 302 via one path only at any given time. Although the signal 308-1 is split into plural signals 309-1$_1$, 309-2$_1$, . . . 309-b$_1$ which are provided to plural ROADMs 304-1, 304-2, . . . 304-b via plural respective paths, only one signal (i.e., a signal of the working path, e.g., 309-1$_1$) is permitted to pass by a corresponding one of the plural ROADMs 304-1, 304-2, . . . 304-b (e.g., ROADM 304-1), and the other signals (i.e., signals of the protection paths, e.g., 309-2$_1$ to 309-b$_1$) are blocked by the other ones of the plural ROADMs 304-1, 304-2, . . . 304-b (e.g., ROADMs 304-2 to 304-b).

When not being used for protection purposes, the n protection paths (e.g., the paths including ROADMs 304-2 to 304-b) can either be left idle or can be used to carry extra traffic (e.g., low priority traffic). If the working path (e.g., the path carrying signal 309-1$_1$ to the network via the ROADM 304-1) experiences a failure (e.g., as detected by one or more electrical and/or optical monitoring points, such as, 319-1 to 319-b, 352-1 to 352-c, and/or 320-1$_1$ to 320-a$_c$, as described above in the context of FIG. 3) while a particular protection path (e.g., the path carrying signal 309-2$_2$ to the network via the ROADM 304-2) is carrying low priority traffic (e.g., from port module 301-1$_2$), then the low priority traffic is dropped and the protection path (e.g., the path carrying signal 309-2$_2$ to the network via the ROADM 304-2) is used to carry the traffic that was previously being carried by the working path (i.e., signal 309-1$_1$).

In particular, in the 1:n protection scheme, in order to coordinate which traffic flow is being carried by which path (i.e., the working path or the one or more protection paths), switching is performed at the transmitting network element by the ROADMs 304-1 to 304-b and at the receiving network element by the switching modules 414-1 to 414-c. Accordingly, in addition to the same components as those shown in FIG. 3, in one example embodiment, the port modules 301-1$_1$ to 301-a$_c$ of the network element 600 also include corresponding switching control modules 602-1$_1$ to 602-a$_c$ to coordinate and/or control such switching.

In one example embodiment, in-band and/or out-of-band messages are communicated between the switching control modules 602-1$_1$ to 602-a$_c$ of the transmitting network element and of the receiving network element to coordinate which path is to be used for a particular traffic flow (e.g., a working traffic flow, or a low priority traffic flow) at a given time, based on various criteria (e.g., power levels detected at one or more electrical and/or optical monitoring points, such as, 319-1 to 319-b, 352-1 to 352-c, and/or 320-1$_1$ to 320-a$_c$), as described above in the context of FIG. 3. In particular, each port module 301-1$_1$ to 301-a$_c$ includes a corresponding one of switching control modules 602-1$_1$ to 602-a$_c$ that transmit messages to, and receive messages from, corresponding switching control modules 602-1$_1$ to 602-a$_c$ of a remote network element (not shown in FIG. 6), by using in-band messages (e.g., messages included in one or more of signals 306-1$_1$ to 306-a$_c$ and 313-1 to 313-a$_c$) or out-of-band messages, to coordinate which paths are being used for particular types of traffic. The switching control modules 602-1$_1$ to 602-a$_c$ also transmit messages to, and receive messages from, the ROADMs 304-1 to 304-b to coordinate which paths are being used for particular types of traffic. In particular, although not shown in FIG. 6 for purposes of convenience, each of the switching control modules 602-1$_1$ to 602-a$_c$ is communicatively coupled to each of the ROADMs 304-1 to 304-b by way of electrical backplane signals, by which the switching control modules 602-1$_1$ to 602-a$_c$ provide control signals to, and/or receive status signals from, the ROADMs 304-1 to 304-b to coordinate which channels are permitted to pass and which are blocked at any given time.

During normal operation (i.e., in the absence of a failure of the working path, e.g., the path including ROADM 304-1), the ROADMs of the protection paths (e.g., the middle and right-most ROADMs 304-2 to 304-b) are used to transmit low priority traffic from other port modules (e.g., the middle set of port modules 301-1$_2$ to 301-a$_2$ and the right-most set of port modules 301-1$_c$ to 301-a$_c$). If one or more channels of the working path experiences a failure, then corresponding ones of the switching control modules 602-1$_1$ to 602-a$_c$ communicate (by way of electrical backplane signals not shown in FIG. 6) one or more messages to each other, to corresponding ones of the ROADMs 304-1 to 304-b, and to a corresponding ones of the switching control modules 602-1$_1$ to 602-a$_c$ of a remote network element to cause the corresponding ones of the ROADMs 304-1 to 304-b and the corresponding ones of the switching control modules 602-1$_1$ to 602-a$_c$ of a remote network element to reroute the traffic (e.g., included in signal 309-1$_1$) that was previously carried by the working path (e.g., the path including ROADM 304-1) so that the traffic (e.g., included in signal 309-2$_1$) is instead carried by one of the one or more protection paths (e.g., the path including ROADM 304-2), and to block the low priority traffic that was previously being carried by the protection path.

As is apparent in view of the above description of FIG. 6, the network element 600 may be utilized to provide 1:n protection for multiple optical channels included in a WDM signal, while enabling separate switching (and thus separate protection) of individual optical channels. Additionally, the use of the electrical monitoring points (e.g., one or more of monitoring modules 320-1$_1$ to 320-a$_c$) in addition to optical monitoring (e.g., OCM 352-1 to 352-c, and/or OCM 319-1 to OCM 319-b) enables more rapid detection of signal defects than may be possible by using optical monitoring (e.g. OCM) alone, thereby enabling detection of signal defects at a rate sufficiently high to enable fast switching times, such as those that may be demanded for certain types of high-priority network traffic (e.g., digital telephone traffic). In addition, electrical monitoring enables detection of further types of signal defects as compared to the types of defects detectable using only optical monitoring.

As can be appreciated in view of the foregoing description, the example aspects herein provide a procedure, as well as an apparatus, system, and computer program that operate in accordance with the procedure, to provide protection for optical communication network connections. Unlike traditional systems, which require multiple individual OPSMs to provide protection of multiple optical channels (e.g., one OPSM per channel), the example embodiments described herein can simultaneously provide protection of multiple optical channels (on a per-channel basis) using multiple protection paths (e.g., via multiple degrees) in a single add/drop terminal (e.g., add/drop terminal 303). Additionally, in accordance with example aspects herein, not only can the example embodiments herein provide network protection through defect detection in the optical domain (which can be relatively slow), the embodiments herein can also provide high speed (e.g., less than 50 millisecond switching time) network protection through defect detection in the electrical domain. Moreover, the example embodiments herein enable high speed protection switching to support various applications that may require rapid switching times. Furthermore, performing electrical monitoring in the port modules is a cost-effective solution that enables high speed protection switching without the need for additional dedicated standalone high speed defect detection modules to be added to a network element.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A system comprising at least one network terminal, each such network terminal including:
   a switch to which a plurality of WDM signals are applied, each WDM signal including multiple wavelength channels;
   an optical channel monitor configured to optically monitor, in the optical domain, acceptability of one of the WDM signals; and
   a controller arranged to operate the switch such that the switch (a) selects at least one wavelength channel from at least one of the plurality of WDM signals and (b) outputs, at an output of the network terminal, the at least one wavelength channel to a port module external to the network terminal,
   wherein the optical channel monitor provides a signal to the controller based on the optical monitoring,
   wherein the port module provides a signal to the controller by performing electrical monitoring in the electrical domain of the wavelength channel outputted thereto at the output of the network terminal,
   wherein the controller operates the switch such that the switch selects the at least one wavelength channel based on (1) the signal provided by the port module and (2) the signal provided by the optical channel monitor,
   wherein the controller determines (1) based on the signal provided by the port module, whether the electrical monitoring indicates a signal level below a predetermined optical power threshold, and (2) based on the signal provided by the optical channel monitor, whether the optical monitoring indicates a signal level below a predetermined optical power threshold, and
   wherein the controller operates the switch such that, if it is determined that the electrical monitoring indicates a signal level below a predetermined optical power threshold or the optical monitoring indicates a signal level below a predetermined optical power threshold, the switch selects a wavelength channel, from at least one of the plurality of WDM signals, different from the selected at least one wavelength channel.

2. The system of claim 1, further comprising the port module, the port module arranged to receive the at least one wavelength channel outputted thereto at the output of the network terminal, convert the at least one wavelength channel to an electrical signal, and electrically monitor the electrical signal in the electrical domain,
wherein the port module provides the signal to the controller based on said electrical monitoring of the electrical signal.

3. The system of claim 2, wherein the controller includes a coupling for receiving the signal provided by the port module, thereby to provide an indication of the electrical domain monitoring to the controller of the network terminal.

4. The system of claim 2, wherein the port module electrically monitors the electrical signal for at least one of a loss of signal, a loss of frame, or a pre-forward error correction bit error rate.

5. The system of claim 2, wherein the port module includes a transmit terminal and the network terminal includes a plurality of inputs of which one input is provided with a transmit signal from the transmit terminal of the port module.

6. The system of claim 5, wherein the network terminal further includes a multiplexer arranged to multiplex signals received over the plurality of inputs of the network terminal to provide a multiplexed signal.

7. The system of claim 6, wherein the network terminal further comprises a splitter arranged to split a multiplexed signal output by the multiplexer.

8. The system of claim 7, wherein the network terminal further includes an optical matrix interposed between the plurality of inputs of the network terminal and the multiplexer, and arranged to route signals received over the plurality of inputs of the network terminal to corresponding ones of a plurality of inputs of the multiplexer.

9. The system of claim 7, further comprising at least one reconfigurable optical add/drop multiplexer (ROADM) arranged for at least one of forwarding a WDM signal to the network terminal from a communication network, or forwarding split signals provided by the splitter to the communication network.

10. The system of claim 9, wherein the port module also is arranged to provide, based on the electrical monitoring, a control signal to a remote network element by way of the communication network, so that the remote network element selects at least one of the split signals, based on the control signal.

11. The system of claim 9, wherein the ROADM includes a monitoring module configured to optically monitor, in the optical domain, acceptability of the respective WDM signal and to provide a signal to the controller.

12. The system of claim 11, wherein the controller operates the switch such that the switch selects the at least one wavelength channel based on (1) the signal provided by the port module, (2) the signal provided by the optical channel monitor, and (3) the signal provided by the monitoring module.

13. The system of claim 1, wherein the network terminal further includes a demultiplexer interposed between the switch and the output of the network terminal, and arranged to demultiplex wavelength channels output by the switch.

14. The system of claim 13, wherein the output of the network terminal includes a plurality of outputs, and the network terminal further includes an optical matrix arranged to forward wavelength channels demultiplexed by the demultiplexer to corresponding ones of the plurality of the outputs of the network terminal.

15. The system of claim 1, wherein each of the plurality of WDM signals includes a plurality of multiplexed wavelength channels.

16. The system of claim 1, wherein the port module performs electrical monitoring in the electrical domain by decoding of the wavelength channel outputted thereto at the output of the network terminal, and by detecting errors present in digital bits of the decoded signal.

17. A procedure for transferring wavelengths, the procedure comprising:
applying a plurality of WDM signals to a switch of a network terminal, each WDM signal including multiple wavelength channels;
optically monitoring, in the optical domain with an optical channel monitor, acceptability of one of the WDM signals;
operating the switch such that the switch:
(a) selects at least one wavelength channel from at least one of the plurality of WDM signals, and
(b) outputs, at an output of the network terminal, the at least one wavelength channel to a port module external to the network terminal,
wherein the optical channel monitor provides a signal based on the optical monitoring,
wherein the port module provides a signal by performing electrical monitoring in the electrical domain of the wavelength channel outputted thereto at the output of the network terminal, and
operating the switch such that the switch selects the at least one wavelength channel based on (1) the signal provided by the port module and (2) the signal provided by the optical channel monitor,
determining (1) based on the signal provided by the port module, whether the electrical monitoring indicates a signal level below a predetermined optical power threshold, and (2) based on the signal provided by the optical channel monitor, whether the optical monitoring indicates a signal level below a predetermined optical power threshold; and
operating the switch such that, if it is determined that the electrical monitoring indicates a signal level below a predetermined optical power threshold or the optical monitoring indicates a signal level below a predetermined optical power threshold, the switch selects a wavelength channel, from at least one of the plurality of WDM signals, different from the selected at least one wavelength channel.

18. The procedure of claim 17, further comprising:
providing the at least one wavelength channel outputted at the output of the network terminal to the port module;
converting the at least one wavelength channel to an electrical signal; and
electrically monitoring the electrical signal in the electrical domain,
wherein the port module provides the signal to the controller based on said electrical monitoring of the electrical signal.

19. The procedure of claim 18, wherein the signal received from the port module is received via a coupling of the network terminal, thereby to provide an indication of the electrical domain monitoring to the controller of the network terminal and to effect operation of the switch.

20. The procedure of claim 18, further comprising electrically monitoring the electrical signal for at least one of: a loss of signal, a loss of frame, or a pre-forward error correction bit error rate.

21. The procedure of claim 17, further comprising demultiplexing wavelength channels output by the switch.

22. The procedure of claim 21, further comprising forwarding the demultiplexed wavelength channels to corresponding ones of a plurality of outputs of the network terminal.

23. The procedure of claim 17, wherein each of the plurality of WDM signals includes a plurality of multiplexed wavelength channels.

24. The procedure of claim 17, wherein the port module performs electrical monitoring in the electrical domain by decoding of the wavelength channel outputted thereto at the output of the network terminal, and by detecting errors present in digital bits of the decoded signal.

25. An optical network terminal comprising:
a switch arranged to receive a plurality of WDM signals, each WDM signal including multiple wavelength channels, the switch being constructed for controllable selection of wavelength channels from each of the WDM signals;
a controller constructed to control selection of wavelength channels by the switch;
an optical channel monitor configured to optically monitor, in the optical domain, acceptability of one of the WDM signals, and to output a signal based on the optical monitoring; and
an output whereby the selected wavelength channels are outputted to respective receive terminals of corresponding port modules,
wherein each of the port modules electrically monitors, in the electrical domain, characteristics of the received wavelength channel and outputs a signal indicative of acceptability of the received wavelength channel, and
wherein the controller includes a coupling for receiving the signal output by each port module, and controls selection by the switch based at least in part on (1) the signal output from at least a portion of the port modules and (2) the signal output from the optical channel monitor,
wherein the controller determines, for a selected wavelength channel, (1) based on the signal provided by the respective port module, whether the electrical monitoring indicates a signal level below a predetermined optical power threshold, and (2) based on the signal provided by the optical channel monitor, whether the optical monitoring indicates a signal level below a predetermined optical power threshold, and
wherein the controller controls selection by the switch such that, if it is determined that the electrical monitoring indicates a signal level below a predetermined optical power threshold or the optical monitoring indicates a signal level below a predetermined optical power threshold, the switch selects a wavelength channel, from at least one of the plurality of WDM signals, different from the selected wavelength channel.

26. The optical network terminal of claim 25, further comprising plural inputs for receiving a plurality of WDM signals from plural reconfigurable optical add/drop multiplexers (ROADM), each such ROADM being arranged for forwarding a WDM signal to the optical network terminal from a communication network,
wherein each such ROADM includes a monitoring module configured to optically monitor, in the optical domain, acceptability of the respective WDM signal and to output a signal.

27. The optical network terminal of claim 26,
wherein the controller controls selection by the switch based on (1) the signal output from at least a portion of the port modules, (2) the signal output from the optical channel monitor, and (3) the signal output from at least a portion of the monitoring modules.

28. The optical network terminal of claim 26, wherein the port modules each includes a transmit terminal for outputting a transmit signal,
wherein the optical network terminal further comprises:
a plurality of inputs each being provided with a transmit signal from a respective one of the port modules;
a multiplexer arranged to multiplex transmit signals received over the plurality of inputs of the network terminal to provide a multiplexed signal; and
a splitter arranged to split the multiplexed signal output by the multiplexer into plural split signals, and
wherein the plural split signals from the splitter are provided to the plural ROADMs for forwarding to the communication network.

29. The optical network terminal of claim 25, wherein each of the port modules performs electrical monitoring in the electrical domain by decoding of the received wavelength channel, and by detecting errors present in digital bits of the decoded signal.

* * * * *